Aug. 7, 1956
G. P. MORGAN
2,757,592
GEARED PLOW HITCH
Filed Jan. 2, 1953
2 Sheets-Sheet 1
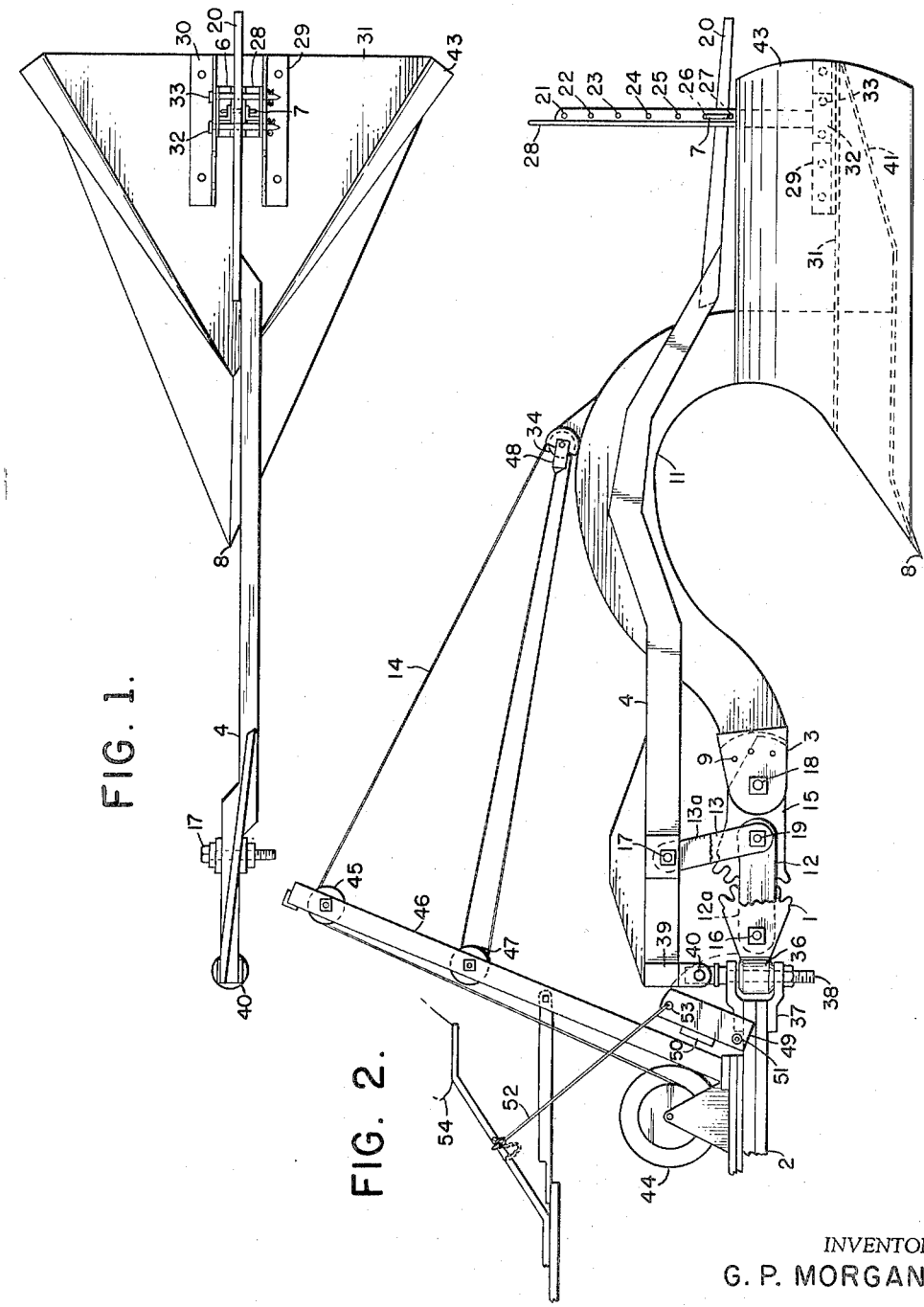
INVENTOR
G. P. MORGAN
BY Z. A. Seegrist
R. Hoffman
ATTORNEYS Aug. 7, 1956

G. P. MORGAN 2,757,592

GEARED PLOW HITCH

Filed Jan. 2, 1953

INVENTOR
G. P. MORGAN

BY

ATTORNEYS 2,757,592
Patented Aug. 7, 1956

2,757,592

GEARED PLOW HITCH

George P. Morgan, Asheville, N. C.

Application January 2, 1953, Serial No. 329,488

2 Claims. (Cl. 97—46.95)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a new type of plow hitch that is particularly useful for plowing fire ditches in mountainous country and other locations of irregular terrain.

Prior to the invention, plows were held in the ground either by hydraulic means or were free floating. Plows held in the ground by hydraulic lifts require constant depth adjustment by the tractor driver. This presents difficulties in steep country since the operator is required to use both hands in controlling the tractor. On the other hand, lines made by free floating plows usually have considerable skip due to frequent changes in grade and soil structure, and the presence of logs, leaves, roots, and rocks.

It is, therefore, one object of the invention to devise a plow hitch that will permit the plow to automatically adjust itself to sudden changes in terrain.

It is a further object to devise a plow hitch such that once it is adjusted to operate at a given depth, will permit the plow to dig up a line of constant depth.

Other objects will become apparent from the following description and the accompanying drawings.

Figure 1 is a plan view of the plow and arrangement of the pressure bar above it.

Figures 2 and 4 are side elevations showing the details of how the plow is hitched to the tractor. In these views the machine is ready for operation.

Figure 3:
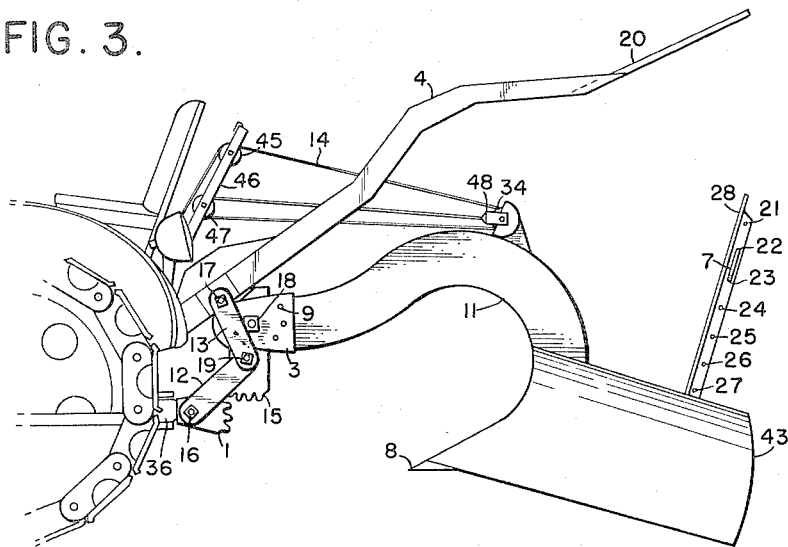
Figure 3 is a side elevation showing the pressure bar raised and the plow raised to deadheading position.
Figure 4:
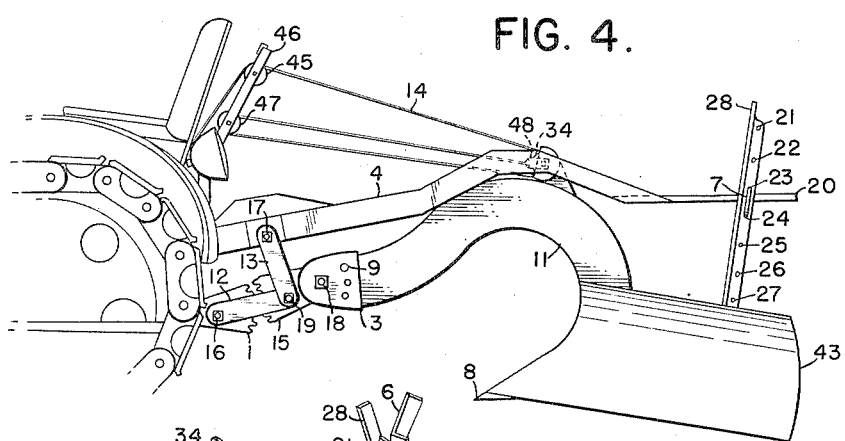
Figure 5:
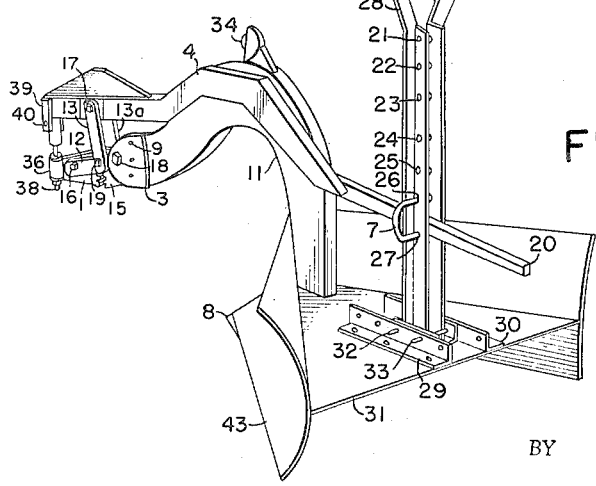
Figure 5 is a perspective view from the left rear position showing placement of the uprights and further details of the hitch.

The hitch itself consists of a pair of meshed gear segments 1 and 15, with one of the segments, 1, connected to the tractor drawbar 2 by means of the eye 37 and block 36. This segment is rigidy secured to block 36, such as, by welding, and may pivot in a horizontal plane about bolt 38 inserted through eye 37 and block 36. Meshed with segment 1 is the other segment 15 which is connected to the forward end of the plow beam 3 by means of pin 18. This segment 15 is free to rotate about pin 18. Secured to pin 38 by means of pin 40 is a U-shaped pivot bearing 39 which is capable of rotating about the pin 40. This bearing is in turn rigidly secured, as by welding, to the forward end of an elongated pressure bar 4, which ends in a handle 20. Connecting the gear segments is a pair of parallel lever-like links 12 and 12a, having the segments between them and pivotally secured to the segments by means of pins 16 and 19. Another pair of similar links 13 and 13a connect the rear segment 15 and the pressure bar 4 by means of pins 17 and 19. Secured to the top plate 31 of the plow are two brackets 29 and 30 to which are fastened two vertical uprights 6 and 28 by means of pins 32 and 33. These uprights are provided with a series of holes 21 to 27. Pressure, and thus working depth, are regulated by securing the handle portion 20 of the pressure bar 4 at any desired level by slipping the handle between the pair of uprights and fastening it by means of hairpin bolt 7. The plow may be raised by means of a small hand-operated winch 44 mounted near the driver's seat. A cable 14, wound around the drum of the winch passes over pulley 45 mounted on upright pole 46 which is secured to the tractor near the driver's seat. This cable then passes over pulley 34 on plow beam 3, back over pulley 47 on pole 46, and is secured by means of strap 48 to pulley 34. Turning the crank (not shown) on the winch will shorten cable 14 which is passed around pulley 34 on the plow beam, thus raising the latter. Since the plow beam 3 and pressure bar 4 are secured together at their rear ends by means of pin 7, the two members are fixed with respect to one another. Therefore, when cable 14 is drawn up, pressure bar 4 will rotate counterclockwise about pin 40, while the plow and its pivot point 18 will travel in an arc concentric with that travelled by pressure bar 4. To prevent the plow from swinging sideways a safety latch 42 may be dropped over the hitch. As shown in Figure 2, this latch comprises parallel plates 49, only one of which is viisible, with cross bar 50 welded to them. Cross bar 50 is selected of such length that plates 49 are far enough apart to permit them to fit over eye 37. The bar 50 is also set far enough from the free ends of plates 49 so as not to strike eye 37 when the latch is lowered. The plates are pivoted about pin 51, secured to drawbar 2, to rotate in a vertical plane. Cable 52, one end of which is secured to the end of the latch through hole 53 and the other end of which is secured to seat 54 within reach of the operator, is used to raise and lower the latch. The plow may also be raised by one man by lifting the pressure bar, as shown in Figure 3. This is accomplished by unpinning the pressure bar from uprights 6 and 28 and raising handle 20. It can then be held in this position for deadheading by inserting a bolt in the upper hole 9, at the forward end of the plow beam 3 so that it passes under the end of segment 15.

The plow itself is of improved design. Where the machine is used to plow a fire line roots present a serious obstacle. The plow point will get caught under roots, making it necessary to back up. To facilitate this, a plate 41 that curves from near the plow point 8 to meet the upper plate 31 at the back of the plow near the top of the moldboard 43 has been added to act as a sled to raise the plow when backing. In addition, the throat of the beam 11, beginning from well ahead of the plow point, is shaped in a perfect circular arc. This permits the accumulated leaves, which are too light to roll with the sod, to roll out on each side before they pack sufficiently to pull the plow out of the ground.

As can be seen from the drawings, the geared hitch of this invention presents some unusual features. When the tractor starts up a hill the draw bar goes down, but the plow beam is raised, thus preventing the plow from burying itself so deepdly that it puts an added strain on the tractor. On the other hand, when the tractor starts downhill, the draw bar goes up; but the geared hitch forces the plow into the ground. This avoids the skip which usually occurs with a freefloating plow unless it is set unnecessarily deep.

The pressure bar accentuates this action. At the same time it maintains a constant pressure on the plow at the point which will best hold it level and in the ground. This pressure is the result of the forces due to the upward or downward motions of the rear of the tractor, which forces are transmitted through the linkages to the pressure bar and, in turn, to the rear of the plow. This pressure may be adjusted as previously described, by setting the height of the pressure bar between the two uprights and securing it in position by means of the hairpin bolt. Once the pressure bar is properly set, further adjustment while plowing is not necessary. This is an important improvement since it removes the temptation to throw on rocks while the plow is in motion and the even more unsafe practice of jumping on the back of the plow to hold it in the ground.

I claim:

1. Hitching means for coupling a tractor to a drawn implement comprising a pair of meshed gear segments, one of said segments being disposed in a vertical plane and pivotally attachable to the draw bar of said tractor and adapted to pivot in a horizontal plane, the other of said segments also disposed in a vertical plane and pivotally attachable to the forward end of the drawn implement and adapted to pivot in a vertical plane; an elongated bar attachable at the forward end thereof to the first mentioned segment through pivot means; links pivotally connected to the gear segments and elongated bar, one pair of said links connecting the two gear segments and another pair of said links connecting the elongated bar and the second mentioned segment.

2. Hitching means for coupling a tractor to a plow comprising a pair of meshed gear segments, one of said segments being disposed in a vertical plane and pivotally attachable to the draw bar of said tractor and adapted to pivot in a horizontal plane, the other of said segments also disposed in a vertical plane and pivotally attachable to the forward end of a plow beam and adapted to pivot in a vertical plane; an elongated bar attachable at the forward end thereof to the first mentioned segment through pivot means; said elongated bar being of sufficient length to extend rearward to a point above the rear plate of the plow and adapted to apply pressure to said plow; links pivotally connected to the gear segments and elongated bar, one pair of said links connecting the two gear segments and another pair of said links connecting the elongated bar and the second mentioned segment.

References Cited in the file of this patent

UNITED STATES PATENTS

| | | |
|---|---|---|
| 2,405,334 | Silver | Aug. 6, 1946 |
| 2,426,847 | Smith | Sept. 2, 1947 |
| 2,437,059 | Williams | Mar. 2, 1948 |
| 2,621,575 | Berg | Dec. 16, 1952 |